United States Patent [19]

Nilsson

[11] 3,940,186

[45] Feb. 24, 1976

[54] ADJUSTABLE BALL GROOVE SLIDE

[75] Inventor: Sven Walter Nilsson, Goteborg, Sweden

[73] Assignee: SKF Industrial Trading and Development Company, B.V., Jutphaas, Netherlands

[22] Filed: Oct. 11, 1973

[21] Appl. No.: 405,373

[52] U.S. Cl. ................................. 308/6 C
[51] Int. Cl.² ........................... F16C 29/12
[58] Field of Search ............... 308/6 C; 64/23.7

[56] References Cited
UNITED STATES PATENTS

| | | | |
|---|---|---|---|
| 3,398,999 | 8/1968 | Halvorsen | 308/6 C |
| 3,540,782 | 11/1970 | Worm | 308/6 C |
| 3,547,502 | 12/1970 | Howard | 308/6 C |

Primary Examiner—Robert S. Ward, Jr.
Assistant Examiner—Robert Saifer
Attorney, Agent, or Firm—Daniel M. Rosen

[57] ABSTRACT

An adjustable ball groove slide having a slide movable axially along a beam, with balls secured in recirculation paths between the beam and slide, and pressure members carried by the slide for partially defining said paths, with adjustment means for varying selectively the force on said pressure members and the play in the assembly of the beam, balls and slide.

4 Claims, 4 Drawing Figures

ADJUSTABLE BALL GROOVE SLIDE

BACKGROUND OF THE INVENTION

The present invention relates to an improved embodiment of an earlier known device for rectilinear guiding of a machine element along a beam which is provided with at least two parallel ball paths. The paths are preferably arranged on each side of the longitudinal central plane of the beam, and said ball paths are designed to give angle contact with the balls, whereby a machine member in the rectilinear guide is provided with deflection and recirculation tracks for the balls. A mechanism of this kind is designated a ball groove slide.

The earlier known device has certain disadvantages in regard to its manufacture and functioning. Since the paths for the bolts are integrated in the proper machine member, they must be machined and hardened which makes the design more expensive. Furthermore, in the prior art device there are no possibilities to eliminate play which could occur between the ball-cooperating parts when matching the same, or which could occur due to wear during operation.

SUMMARY OF THE INVENTION

The novelty of the invention is characterized in that the new ball groove slide is provided with trough-shaped sheet metal strips inserted into the machine member of this device, which strips serve as paths for the balls then strips are either fixed or resilient adjusting or compensation members for eliminating play.

The invention will now be described in more detail with reference to the accompanying drawings.

DETAILED DESCRIPTION OF THE PREFERRED EMBODIMENT

Figure 1:
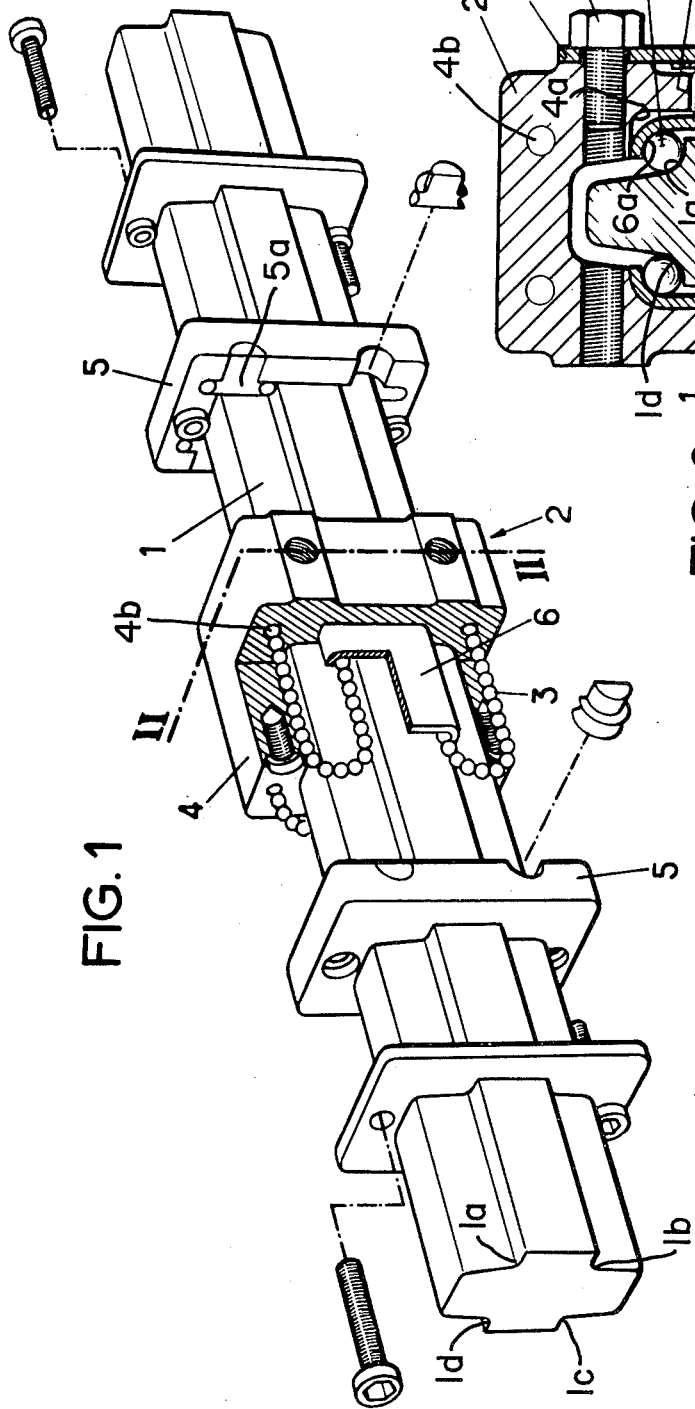
FIG. 1 is an exploded perspective view of a ball groove slide in accordance with the invention.

The main parts of the ball groove slide comprise the beam 1 with ball-bearing grooves 1a – 1d forming portions of the ball paths, the machine member 2 and the balls 3 as shown in FIG. 1. The machine member or slide comprises a middle portion 4 and end flanges 5. In the interior of the middle portion 4 recesses 4a have been machined, in which trough-shaped sheet metal strips 6 and 6' have been placed, one on each side of the beam 1 and the assembly is arranged in such a manner that at least one of the strips is resilient or adjustable. Each of said strips is generally C-shaped in cross-section, formed by a web and flanges extending transversely from edges of the web, with ball grooves defined by and along adjacent surfaces of said web and flanges on the inner side of the strip.

The strips have two functions, partly to provide second or slide ball-bearing grooves cooperating with said first or beam ball-bearing grooves in the beam to provide recirculating channels for the balls 3 within the slide, and partly, at least for the strip or pressure member 6 to function as a resilient or adjustable play-eliminating member so that a desired adjustment or selective force between the beam, the balls and the slide is obtainable. The end flanges 5 each include a recirculation track 5a for guiding balls from the portion of the recirculation path defined by ball-bearing groove 1a of the beam and corresponding grooves 6a in strip 6 to the portion of the path 4b within slide 4. It should be noted that the beam 1 has a generally cross-shaped cross-section formed by intersecting perpendicular elements with the ball-bearing grooves (surfaces, paths, or tracks) 1a, 1b, 1c and 1d located at the intersections of said two elements.

Figure 2:
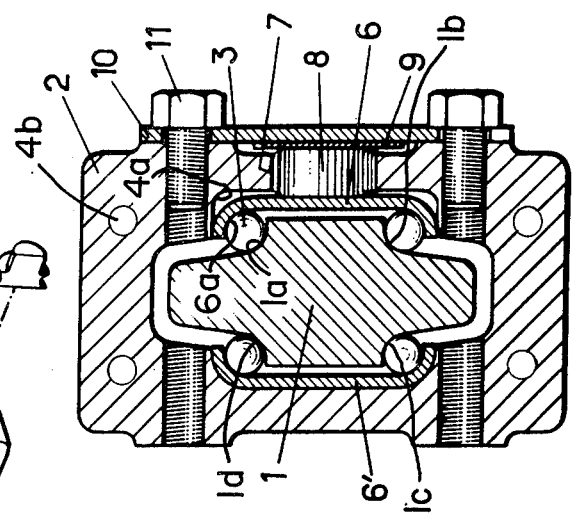
FIG. 2 is a cross-sectional view of the device taken along line II—II in FIG. 1.

In FIG. 2 an embodiment is shown with adjustment possibilities for the strip 6. In the side of the machine member one or more holes 7 are drilled; a plunger 8 rests against the back side of the strip 6. To achieve the adjustment which is desired, a thin sheet of metal 9 is placed against the end of the plunger remote from the strip 6. In order to secure the adjusting device in the machine member, a cover 10 is placed outside the adjusting strip 9 and the assembly is locked by means of bolts 11. In order to obtain resilience and self-adjusting, it is possible to exchange the cover 10 for one or more blade springs, which are fixed in the same way as the cover 10.

Figure 3:
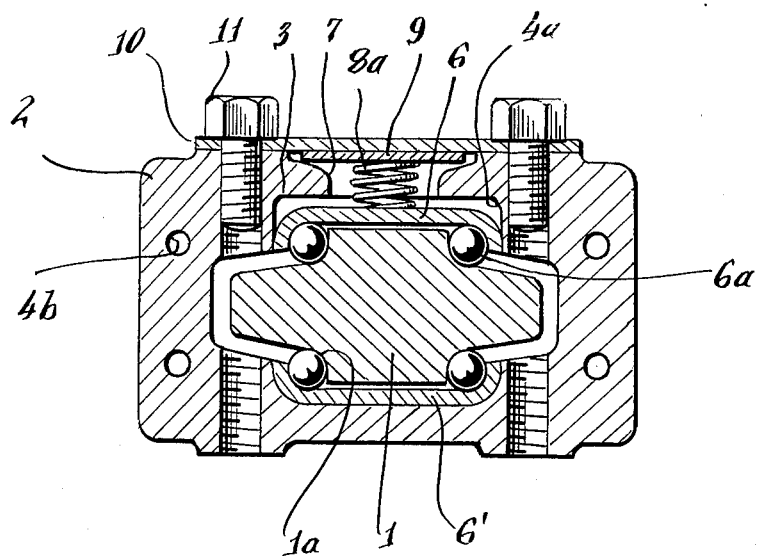
FIG. 3 is a cross-sectional view similar to FIG. 2 of another embodiment of the invention.

In another modification, shown in FIG 3 the plunger is exchanged for a helical spring 8a, which is pressed by the cover 10.

Figure 4:
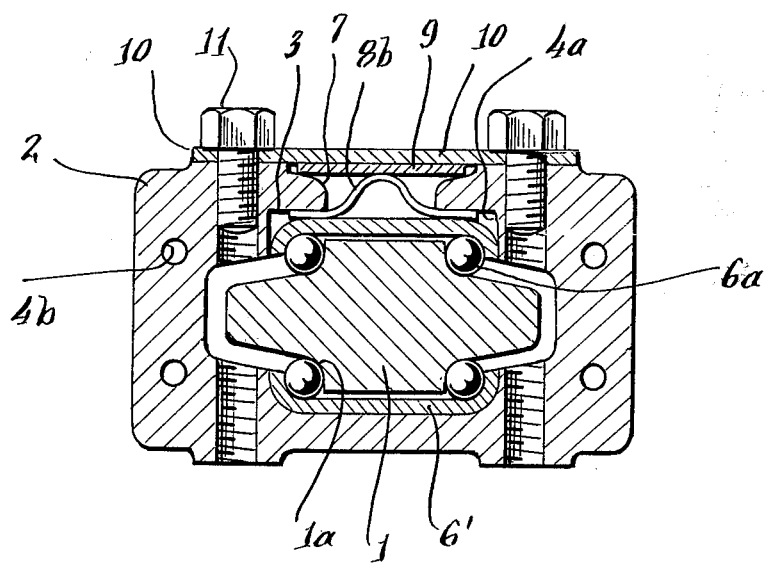
FIG. 4 is a cross-sectional view similar to FIG. 2 of a further embodiment of the invention.

In a further modification, shown in FIG. 4, a blade spring 8b is placed into a machined groove in the machine member behind the strip 6. Furthermore, it is possible to bend the strip 6 in such a manner that it will itself be resilient when placed in its recess 4a in the machine member 4.

I claim:

1. In a ball groove slide device including a beam having a longitudinal axis and a slide axially slidable thereon, the beam having a predetermined cross-section and the slide having a first aperture therethrough of cross-section corresponding generally to that of said beam and through which said beam extends in said sliding relationship, the device further including a plurality of balls in at least one recirculation path at least a portion of which path is parallel to said axis and is formed in part by an axially extending first ball-bearing groove in said beam, the improvement in combination therewith comprising a pressure member carrried by said slide and having an inner side adjacent said first groove in the beam and an opposite outer side, the inner side including an axially-extending second groove engaging balls in said first groove, and adjustment means carried by said slide for providing a selectively variable force on said pressure member inward against said balls which are thus urged against said first groove in the beam, for varying the play between said beam and said slide, and wherein said adjustment means comprises a plunger which is carried by said slide and contacts said pressure member, and locking means on said slide for securing said adjustment means and for urging said plunger inward against said pressure member with said selectively variable force, and wherein said slide comprises a wall adjacent said pressure member, and said wall includes therethrough a second aperture in which is situated said plunger, and said locking means comprises a cover contacting said plunger and fastener means urging said cover inward against said plunger which is thus urged inward toward said beam.

2. In a ball groove slide device including a beam having a longitudinal axis and a slide axially slidable thereon, the beam having a generally cross-shaped cross-section defined by two intersecting elements which define four intersections, with a beam ball-bearing groove defined by and along each of said intersections, and the slide having a first aperture therethrough of cross-section corresponding generally to that of said beam and through which said beam extends in said sliding relationship, the device further including a plurality of balls in recirculation channels at least a portion of which channels are parallel to said axis and formed in part by said axially-extending beam grooves, the improvement in combination therewith comprising a first pressure member carried by said slide and having an outer side, and an inner side which includes therein two axially-extending slide grooves which are adjacent and form, with two of said beam grooves, portions of said recirculation channels, the improvement further comprising adjustment means carried by said slide and contacting said pressure member for providing a selectively variable force on said pressure member inward against said balls which are thus urged against said beam grooves for varying the play between said beam and said slide, and a second pressure member similar to the first and cooperating similarly with the two remaining beam grooves.

3. A device according to claim 2 wherein said adjustment means comprises removable spring means carried by said slide and engaging the outer side of the pressure member and biased to resiliently urge said pressure member inward against balls in said first groove.

4. In a ball groove slide device including a beam having a longitudinal axis and a slide axially slidable thereon, the beam having a predetermined cross-section and the slide having a first aperture therethrough of cross-section corresponding generally to that of said beam and through which said beam extends in said sliding relationship, the device further including two recirculation channels having portions thereof which are parallel to said axis and formed by spaced apart ball-bearing grooves in said beam, and a plurality of balls in said recirculation channels, the improvement in combination therewith comprising a pressure member carried by said slide and having an inner side adjacent said grooves in the beam and an opposite outer side, said pressure member being generally C-shaped in cross-section formed by a web and transversely extending flanges, the inner side including axially-extending slide grooves engaging balls in said beam grooves, each of said slide grooves formed by adjacent surfaces of said web and one of said flanges, and adjustment means which is carried by said slide and contacts said pressure member for providing a selectively variable force on said pressure member inward against said balls which are thus urged against said grooves in the beam, for varying the play between said beam and said slide.

* * * * *

UNITED STATES PATENT AND TRADEMARK OFFICE
CERTIFICATE OF CORRECTION

PATENT NO. : 3,940,186
DATED : February 24, 1976
INVENTOR(S) : Sven Walter Nilsson It is certified that error appears in the above-identified patent and that said Letters Patent are hereby corrected as shown below:

Column 1, line 18, delete "bolts" and substitute --balls--;

line 31, delete "then" and substitute --.These--.

Signed and Sealed this

Twenty-sixth Day of October 1976

[SEAL]

Attest:

RUTH C. MASON
Attesting Officer

C. MARSHALL DANN
Commissioner of Patents and Trademarks